INVENTORS:
JOSEPH C. SOFIANEK,
AUGUST L. STREATER,
BY William Freedman
ATTORNEY.

United States Patent Office 3,153,747
Patented Oct. 20, 1964

3,153,747
RAPID RESET TRIPPING ARRANGEMENT FOR
AN ELECTRIC CIRCUIT BREAKER
Joseph C. Sofianek and August L. Streater, Broomall, Pa.,
assignors to General Electric Company, a corporation
of New York
Filed Feb. 5, 1962, Ser. No. 171,110
4 Claims. (Cl. 317—36)

This invention relates to a current-sensitive tripping arrangement for an electric circuit breaker and, more particularly, relates to improved high-speed resetting means for such a tripping arrangement.

In the type of tripping arrangement that we are concerned with, there is a timing circuit that is normally maintained inactive by a gating device. This gating device is sensitive to current flowing through the power line in which the breaker is connected. When this power current exceeds a predetermined value, the gating device operates to render the timing circuit active so that tripping of the breaker can be effected after a time interval determined by the timing circuit. When the overcurrent condition is terminated, as by operation of the circuit breaker or otherwise, the gating device normally responds with a resetting operation that resets the timing circuit to its normal-at-rest condition.

For various reasons which will be explained later, it is important that this resetting operation be effected immediately after the overcurrent condition is terminated. But in the particular arrangement we are concerned with, there is an input circuit for the timing circuit that has a relatively large time constant that tends to prolong the effect of overcurrent even after its termination and thus to detract from the speed at which the gating device responds to effect resetting after the overcurrent terminates.

This problem cannot be solved simply by reducing the value of this time constant because a relatively large time constant is needed for other reasons, which will be explained in detail hereinafter.

Thus, an object of our invention is to construct the tripping arrangement in such a manner that, despite the presence of a relatively large time constant in the input circuit, the gating device can reset at high speed upon termination of an overcurrent condition.

Another object is to construct the tripping arrangement in such a manner that a time constant of the desired high value may be included in the input circuit without unduly detracting from the speed at which the gating device responds to termination of the overcurrent condition.

In carrying out our invention in one form, we provide current-sensing means for deriving from a power line a unidirectional signal voltage having a magnitude varying as a direct function of the magnitude of current in the power line. This signal voltage is smoothed by filtering means and is then applied to a normally-inactive timing circuit as an input voltage. This timing circuit develops an output voltage that builds up at a rate dependent upon the magnitude of the input voltage once the timing circuit is rendered active. The timing circuit is controlled by gating means which has a normal condition for rendering the timing circuit inactive and is operable into a second condition in response to an increase in signal voltage to a predetermined level to render the timing circuit active. The filtering means comprises two capacitors each of which is connected across the current-sensing means. A blocking rectifier is connected between the two capacitors and is poled to permit the two capacitors to be charged in parallel by the signal voltage. The first of these capacitors has a short time constant discharge circuit that provides a path through the gating means over which the first capacitor quickly discharges in response to a decay in signal voltage. The second capacitor has a relatively long time constant discharge circuit through which it discharges in response to a decay in signal voltage. The blocking rectifier is so located and so poled that it prevents discharge current from the second capacitor from flowing through the gating means, whereby the time required for restoration of the gating means to its normal condition is determined independently of the long time constant discharge circuit for the second capacitor.

For a better understanding of our invention, reference may be had to the following description taken in conjunction with the accompanying drawing, wherein.

Figure 1:
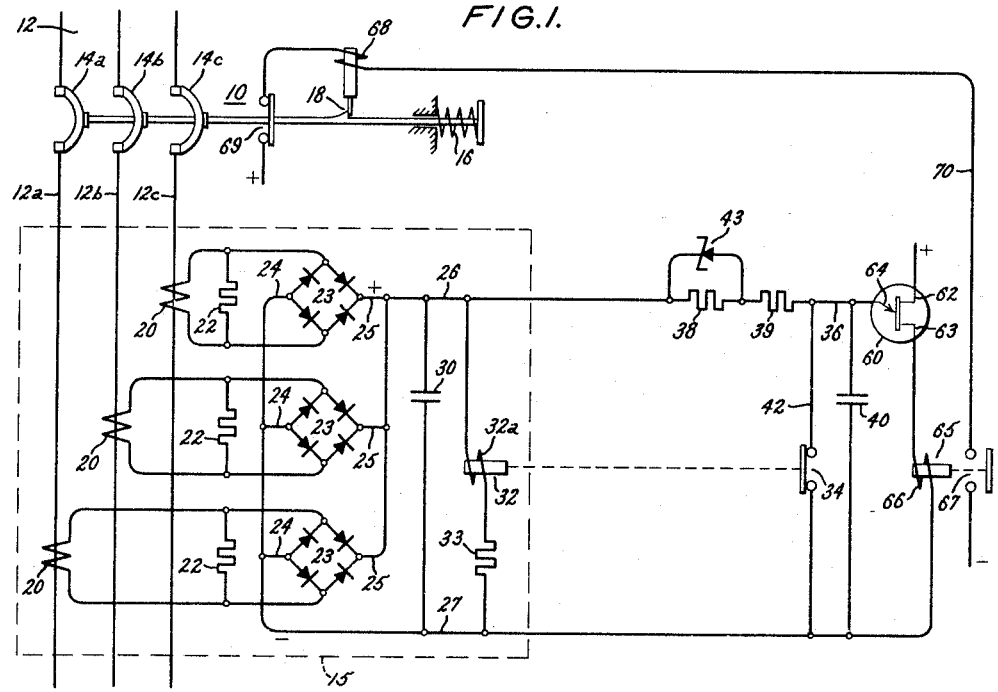
FIG. 1 is a diagrammatic illustration of the general type of tripping arrangement that we are concerned with. This illustration is presented for background purposes and does not contain our invention.

Referring now to FIG. 1, there is shown an electric circuit breaker 10 for controlling the flow of power through a three phase power line 12. The circuit breaker has three sets of separable contacts connected in the respective phases 12a, 12b and 12c of the power line 12. The three sets of contacts comprise movable contacts 14a, 14b and 14c which are coupled together for simultaneous movement. A suitable opening spring 16 biases the movable contacts toward an open circuit position. The circuit breaker is held in its closed position of FIG. 1 by a suitable trip latch 18 that can be released in a manner soon to be described to permit spring 16 to move the movable contacts into open position and thereby interrupt the flow of current through the phases of the power line 12.

The present application is concerned with an arrangement for effecting tripping open of the circuit breaker 10 in response to an overcurrent in any phase of the power line 12 and, more particularly, is concerned with an arrangement for producing such tripping with a time delay that varies in duration inversely with respect to the magnitude of the overcurrent.

The tripping arrangement comprises an input circuit 15, enclosed in a dotted line box, which is relied upon to derive a signal voltage from the power line 12 indicative of the current flowing in its respective phases. For sensing the magnitude of the current flowing in each phase of the three phase power line 12, current transformer secondary windings 20 magnetically coupled to the respective phases are provided. Connected across the terminals of each secondary winding 20 is a resistor 22, across which is developed a voltage varying in magnitude as a direct function of the current induced in the current transformer winding. Across each of these resistors 22, a full-wave rectifier 23 is connected. The output terminals 24, 25 of the three rectifiers are connected in parallel in a circuit 26, 27. If the output terminals 24, 25 of the rectifiers were not connected together, then a unidirectional output voltage proportional to the alternating voltage across resistor 22 would be developed across each set of output terminals 24, 25. But since the rectifiers are connected together and in parallel in the circuit 26, 27, a unidirectional voltage is developed across 26, 27 which is a direct function of the highest output voltage for a given rectifier 23 at a given instant, neglecting for the moment the effect of a smoothing capacitor 30, soon to be described.

To reduce the ripple content of this signal voltage and for other reasons soon to be explained, a smoothing capacitor 30 is connected across the conductors 26, 27. The smoothed, or filtered, signal voltage appearing across capacitor 30 is applied to a pick-up circuit 33, 32a. This pick-up circuit contains the series combination of a resistor 33 and the coil 32a of a gating relay 32. When the signal voltage applied across conductors 26, 27 exceeds a predetermined pick-up value indicative of an overcurrent in the power line 12, the gating relay 32 responds by operating to open its normally-closed contacts 34. Opening of these contacts 34 initiates a timing operation that results in tripping of the circuit breaker 10 if the overcurrent condition persists.

This timing operation is performed by a timing circuit 36 comprising a plurality of resistors 38 and 39 and a timing capacitor 40 connected in series with the resistors when the contacts 34 are opened. Normally, the timing circuit 36 is rendered inactive by a low impedance discharge circuit 42 shunting the capacitor 40 and preventing a significant charge from being built up across the timing capacitor 40. This discharge circuit includes the normally closed contacts 34 of the gating relay 32. When the contacts 34 are opened by the gating relay 32, this discharge circuit is interrupted, and the timing circuit 36 is rendered active.

The purpose of the timing circuit 36 is to provide an output voltage across capacitor 40 for initiating tripping of the circuit breaker after a time interval that varies in duration inversely with respect to the magnitude of the overcurrent. Once the timing circuit has been rendered active by opening of the contacts 34, the period of time required for developing this output voltage depends upon the R-C time constant of the timing circuit and the magnitude of the input voltage. When the output voltage developed across the timing capacitor 40 exceeds a predetermined value, it fires a level detector 60 to initiate a tripping operation, as will soon be described.

The timing circuit is designed so that once it becomes active, the voltage across the timing capacitor 40 builds up to the critical level for firing level detector 60 in a time inversely proportional to approximately the square of the overcurrent for low values of overcurrent. For higher values of overcurrent, this time is inversely proportional to lower exponents of the overcurrent. This change in timing for different levels of overcurrent is achieved by utilizing a Zener diode 43 shunting one of the resistors 38. This relationship, which is not a part of our invention, is disclosed in more detail and is claimed in Application Serial No. 138,476, Dewey, Now Patent No. 3,105,920, filed September 15, 1961, and assigned to the assignee of the present invention.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and the base 63 suddenly drops, allowing greatly increased current to flow from the emitter 64 through the base 63. This greatly increased current is derived from the timing capacitor 34, which, in response to firing of the transistor 60, quickly discharges through the circuit including the emitter 64 and the base 63. Connected in series-circuit relationship with the lower base 63 is the coil 66 of a tripping relay 65. The abruptly increased current that flows through the base 63 in respones to firing of the transistor 60 also flows through this coil 66, causing the relay 65 to pick up and close its contact 67. Closing of the contacts 67 completes a tripping circuit 70 through a trip coil 68 of the latch 18. The trip coil 68 responds by releasing the latch 18 to allow the breaker 10 to open under the bias of its opening spring 16. When the breaker 10 opens, a switch 69 connected in the tripping circuit opens to interrupt the tripping circuit.

It is important that the time delay provided by the disclosed tripping arrangement be independent of the number of phases of the power line 12 in which overcurrent flows. In this regard, whether overcurrent is flowing in only a single phase or in all three phases, the time delay should be of a prescribed duration determined by the highest peak current in any one of the three phases. An obstacle to obtaining this type of performance is the tendency of the signal voltage across conductors 26 and 27 to decay between current peaks in the phase that is carrying the highest current. To counteract this tendency, it is necessary that the capacity 30 have a relatively high capacitance so that the decaying time constant for its discharge circuit is high. The principal controlling portion of this discharge circuit extends from the upper terminal of the capacitor 30 through the coil of gating relay 32, through resistors 33 and back through the capacitor 30 via its lower terminal. With a high time constant for this discharge circuit, the capacitor 30 discharges so slowly that it remains charged to a level near the peak voltage between voltage peaks. Thus, the voltage appearing across conductors 26, 27 is approximately the same for single phase fault as for a multiple phase fault, assuming that the peak voltage developed across the resistors 22 is the same under both sets of conditions.

Another reason that it is desirable that the circuit 30, 32a, 33 have a high time constant is that some provision must be made made to insure correct operation of the tripping arrangement under highly asymmetrical fault current conditions in the power line 12. The D.C. component of such highly asymmetrical fault currents causes the cores (not shown) of the current transformers 20 to saturate almost immediately, thus reducing the secondary current to a negligible value until the D.C. component has drastically decayed. Providing an air gap in each of the cores lessens the severity of this problem but not nearly enough. The relatively large capacitor 30, however, provides a solution for this problem since it is charged during the initial current peak that saturates the core of the current transformer, and its rate of discharge is so slow that the D.C. component of fault current decays sufficiently to desaturate the core before the capacitor 30 has appreciably discharged. Thus, there is signal voltage present across the conductors 26, 27 during this critical period despite the fact that the core of the current transformer is saturated. To assure that the capacitor 30 will operate in this desired manner, the decaying time constant for its discharge circuit should be substantially larger than the decaying time constant of the power circuit 12.

Although the large decaying time constant of the input circuit is advantageous in the two respects noted above, it is disadvantageous in another respect. More specifically, it tends to prolong the effect of an overcurrent even after the overcurrent terminates and thus tends to detract from the speed at which the tripping arrangement can reset to its normal-at-rest condition after termination of the overcurrent. In this respect, assume that the overcurrent condition is terminated before the circuit breaker 10 trips open. Before the gating relay 32 could drop out to restore the timing circuit 36 to its normal-at-rest condition, it would be necessary that the voltage across the capacitor 30 decay to a value that permits dropout of the gating relay 32. The time required for this to occur depends upon the decaying time constant of the input circuit, and because this time constant is high, a relatively long time is required before the gating relay can drop out to reset the timing circuit.

Figure 2:
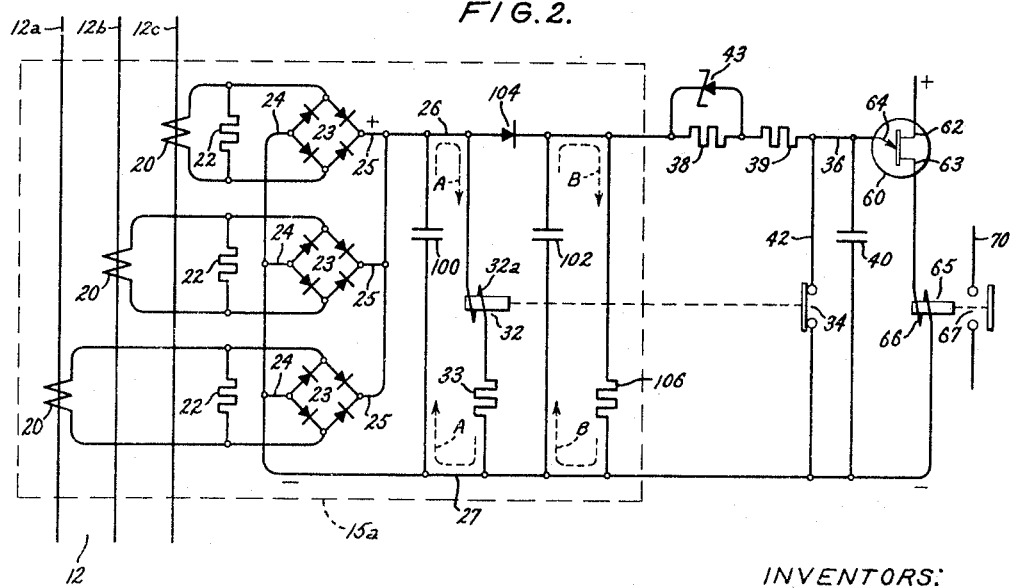
FIG. 2 illustrates one form of our invention for use in the general type of circuit illustrated in FIG. 1.

To shorten this resetting time, we have modified the tripping arrangement of FIG. 1 so that it includes the input circuit 15a of FIG. 2 instead of the input circuit 15 shown in FIG. 1. Corresponding parts of these two input circuits have been assigned corresponding reference numerals, so that a description of the differences between the two input circuits should be sufficient to convey an understanding of the operation of the input circuit of FIG. 2. The rest of the tripping arrangement of FIG. 2 is essentially the same as that of FIG. 1.

Instead of using only a single capacitor, as in FIG. 1, the circuit of FIG. 2 uses a pair of capacitors 100 and 102 each connected across the conductors 26, 27 with a blocking rectifier 104 connected between the capacitors in the line 26. Since the blocking rectifier 104 is in a conducting state during charging of the capacitors, it will be apparent that the two capacitors 100 and 102 are effectively in parallel during such charging and a portion of the charging current flows into capacitor 100 and a portion into capacitor 102. But during capacitor-discharge, the two capacitors 100 and 102 are effectively decoupled from each other by means of the blocking rectifier 104. As a result, the capacitor 100 discharges through the circuit containing the coil 32a of gating relay 32 and the resistor 33, as indicated by the dotted line arrows A; and the capacitor 102 discharges through the circuit containing the resistor 106, as indicated by the dotted line arrows B. The circuit containing the capacitor 100, the coil 32a of the gating relay, and the resistor 33 is designed to have a decaying time constant that is considerably lower than the decaying time constant of the other circuit containing the capacitor 102 and the resistor 106, and thus during discharging of the capacitors the voltage at the upper terminal of the capacitor 102 is always more positive than the voltage at the upper terminal of the capacitor 100. This latter relationship prevents the first capacitor 100 from discharging through the rectifier 104 and the resistor 106, and thus contributes to the isolation of the two capacitor circuits during discharge.

The decaying time constant of the first circuit 100, 32a, 33 must be sufficiently large to prevent the gating relay 32 from following the A.C. ripple that is present in the signal voltage from the rectifiers 23 during conditions in which the ripple content is a maximum, i.e., a single phase fault. But it must be small enough to allow a quick dropout of the gating relay 32 when the overcurrent condition terminates. In one typical embodiment of our invention, this circuit has a decaying time constant of fifteen milliseconds. The voltage across capacitor 100 falls somewhat between peaks, but this time constant is high enough to result in the voltage across the capacitor 100 having an average value of 83 per cent of peak signal voltage during conditions of maximum ripple content, i.e., single phase fault conditions.

In a preferred form of our invention, the decaying time constant of the second circuit 102, 106 is sufficiently high to hold the average voltage across capacitor 102 to within about four percent of the peak voltage during conditions of maximum ripple content. In other words, during single phase fault conditions the average signal voltage across capacitor 102 is about 96 percent of the peak signal voltage. For three phase fault conditions, this average signal voltage is above 99.5 percent of peak signal voltage. It will therefore be apparent that the signal voltage fed to the timing circuit 36 for single phase fault conditions closely approximates that from multiple phase fault conditions, assuming the same peak signal voltage developed across any of the resistors 22. This being the case, the time delay that occurs before the circuit breaker trips will be substantially the same for single phase faults as for multiple phase faults of the same peak current. In other words, this time delay will be essentially independent of the number of phases faulted. In the typical embodiment of my invention referred to hereinabove, the circuit 102, 106 has a decaying time constant of 100 milliseconds, as compared to 15 milliseconds for the other capacitor circuit 100, 32a, 33. This time constant for circuit 102, 106 is much higher than that for the power circuit 12 and thus prevents any serious impairment of the signal voltage during saturation of the cores of the current transformer, as was explained hereinabove in connection with FIG. 1.

This relatively high time constant for the circuit 102, 106 does not interfere with the ability of the tripping arrangement to reset quickly after an overcurrent terminates because the time required for drop out of the gating relay is determined, not by this large time constant, but by the relatively low time constant of the pickup circuit 100, 32a, 33. Because of this relatively low time constant, when an overcurrent terminate, the voltage across capacitor 100 quickly drops to a value low enough to permit the gating relay 32 to drop out to close its contacts 34. This permits the timing capacitor 40 to discharge with no significant delay through the discharge circuit 42, thus restoring the timing circuit to its normal-at-rest condition within a very short time after termination of the overcurrent.

The voltage across the second capacitor 102 is higher than the voltage across the first capacitor 100 during capacitor discharge, but the blocking rectifier prevents the capacitor 102 from discharging through the circuit containing the coil 32a of the gating relay, thus preventing any delay in dropout of the gating relay 32 by continuing discharge of capacitor 102. Since the low impendance discharge circuit 42 shunting the timing capacitor 34 is complete during this interval when capacitor 102 is discharging, the timing capacitor 40 is prevented from being charged by any of the discharge current from capacitor 102.

One of the reasons that it is important for the timing circuit to be restored to its normal-at-rest condition immediately after the overcurrent terminates is that it is important to prevent any unnecessary operation of the circuit breaker 10 after the overcurrent had been terminated by some other means, such as another circuit breaker located down the line 12 from circuit breaker 10. How such an unnecessary operation of the circuit breaker could occur can be explained by referring to FIG. 1. When the input circuit is constructed as shown in FIG. 1, its high time constant prolongs the effect of the overcurrent even after its termination because the capacitor 30 discharges into the timing capacitor 40 for the relatively long period while the gating relay still remains picked up after the overcurrent terminates. This continued discharged into timing capacitor 40 can result in firing of the level detector 60 long after the overcurrent terminates, thus initiating an unnecessary tripping operation.

Another reason why it is desirable to return the timing circuit to its normal-at-rest condition as quickly as possible after an overcurrent terminates, even though the breaker 10 does not open, is that power system coordination normally depends upon the timing circuit 36 being in its normal-at-rest condition when an overcurrent commences. Thus, if a second overcurrent should appear on the power line 12 immediately after the first overcurrent had been terminated by a circuit breaker down the line, then it would be desirable from a system coordination viewpoint that the timing circuit 36 be in its normal-at-rest condition when this second overcurrent commences. If a residual charge is still present on the timing circuit from the first overcurrent when the second overcurrent commences then the shortened response available from the timing circuit as a result of this initial charge might adversely affect system coordination by causing a premature tripping of the circuit breaker 10.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In a tripping arrangement for an electric circuit breaker:
   (a) current-sensing means for deriving from a power line a unidirectional signal voltage having a magnitude varying as a direct function of the magnitude of current in said power line,
   (b) filtering means for smoothing said signal voltage,
   (c) a normally-inactive timing circuit to which said smoothed signal voltage is applied as an input voltage, said timing circuit being arranged to develop an output voltage that builds up at a rate dependent upon the magnitude of the input voltage applied thereto when said timing circuit is rendered active,
   (d) gating means having a normal condition for rendering said timing circuit inactive and operable into a second condition in response to an increase in signal voltage to a predetermined level to render said timing circuit active,
   (e) said filtering means comprising two capacitors each of which is connected across said current-sensing means, and a blocking rectifier connected between said two capacitors and poled to permit said two capacitors to be charged in parallel by said signal voltage,
   (f) a discharge circuit for a first one of said capacitors providing a path through said gating means over which said first capacitor discharges in response to a decay in signal voltage,
   (g) a discharge circuit for the second of said capacitors through which said second capacitor discharges in response to a decay in signal voltage,
   (h) the decaying time constant of the discharge circuit for said first capacitor being substantially smaller than the decaying time constant of the discharge circuit for said second capacitor,
   (i) said blocking rectifier being so located and so poled that it prevents discharge current from said second capacitor from flowing through said gating means, whereby the time required for restoration of said gating means to its normal condition is determined substantially independently of the time constant of the discharge circuit for said second capacitor.

2. The tripping arrangement of claim 1 in which said power line is a polyphase power line and said current sensing means comprises means for deriving from each phase of said power line a unidirectional voltage indicative of the current in the associated phase, means for applying said unidirectional voltages in parallel to said filtering means as said signal voltage, said discharge circuit for said second capacitor having a sufficiently high decaying time constant to maintain the input voltage applied to said timing circuit during single phase faults within about 15 percent of the input voltage applied to said timing circuit for multi-phase faults of the same peak current.

3. The tripping arrangement of claim 1 in which the decaying time constant of said discharge circuit for said second capacitor is substantially greater than the decaying time constant of the power line circuit.

4. A control arrangement comprising:
   (a) a pair of input terminals to which a unidirectional signal voltage is applied,
   (b) filtering means for smoothing said signal voltage,
   (c) a timing circuit to which said smoothed voltage is applied as an input voltage, the timing circuit being arranged to perform a predetermined operation after an interval inversely dependent upon the magnitude of the input voltage applied thereto when said timing circuit becomes active,
   (d) gating means having a normal condition for rendering said timing circuit inactive and operable into a second condition in response to an increase in signal voltage to a predetermined level to render said timing circuit active,
   (e) said filtering means comprising two capacitors each of which is connected across said input terminals, and a blocking rectifier connected between said two capacitors and poled to permit said two capacitors to be charged in parallel by said signal voltage,
   (f) a discharge circuit for a first one of said capacitors providing a path through said gating means over which said first capacitor discharges in response to a decay in signal voltage,
   (g) a discharge circuit for the second of said capacitors through which said second capacitor discharges in response to a decay in signal voltage,
   (h) the decaying time constant of the discharge circuit for said first capacitor being substantially smaller than the decaying time constant of the discharge circuit for said second capacitor,
   (i) said blocking rectifier being so located and so poled that it prevents discharge current from said second capacitor from flowing through said gating means whereby the time required for restoration of said gating means to its normal condition is determined substantially independently of the time constant of the discharge circuit for said second capacitor.

References Cited in the file of this patent

UNITED STATES PATENTS

| 2,242,950 | Harder | May 20, 1941 |
| 2,920,242 | Koss | Jan. 5, 1960 |
| 2,925,535 | Titze | Feb. 15, 1960 |
| 2,977,510 | Adamson | Mar. 28, 1961 |
| 2,983,851 | Hodges | May 9, 1961 |